United States Patent
Huang et al.

(10) Patent No.: US 8,105,492 B2
(45) Date of Patent: Jan. 31, 2012

(54) METHODS FOR RECHARGING NANOPARTICLE-TREATED BEDS

(75) Inventors: Tianping Huang, Spring, TX (US); James B. Crews, Willis, TX (US); John Robert Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 683 days.

(21) Appl. No.: 12/195,995

(22) Filed: Aug. 21, 2008

(65) Prior Publication Data

US 2009/0266765 A1 Oct. 29, 2009

Related U.S. Application Data

(63) Continuation-in-part of application No. 12/111,361, filed on Apr. 29, 2008.

(51) Int. Cl.
*B01D 24/46* (2006.01)
(52) U.S. Cl. ......... 210/670; 210/679; 210/777; 210/792
(58) Field of Classification Search .................. 210/670, 210/673, 674, 777, 778, 792, 679; 166/278, 166/279
See application file for complete search history.

(56) References Cited

U.S. PATENT DOCUMENTS

| | | | |
|---|---|---|---|
| 3,675,717 A * | 7/1972 | Goins et al. ................ | 166/278 |
| 5,219,026 A * | 6/1993 | Shu et al. ................... | 166/278 |
| 6,447,577 B1 * | 9/2002 | Espin et al. ................ | 95/136 |
| 6,838,005 B2 | 1/2005 | Tepper et al. | |
| 6,860,924 B2 * | 3/2005 | Rajagopalan et al. ......... | 96/154 |
| 7,131,491 B2 | 11/2006 | Blauch et al. | |
| 7,204,311 B2 | 4/2007 | Welton et al. | |
| 7,211,320 B1 | 5/2007 | Cooper et al. | |
| 7,258,170 B2 | 8/2007 | Nguyen et al. | |
| 7,703,531 B2 * | 4/2010 | Huang et al. ............... | 166/308.3 |
| 7,721,803 B2 * | 5/2010 | Huang et al. ................ | 166/278 |
| 2003/0134409 A1 | 7/2003 | Mallouk et al. | |
| 2003/0155302 A1 * | 8/2003 | Meng et al. ................ | 210/665 |
| 2005/0252658 A1 | 11/2005 | Willingham et al. | |
| 2007/0175196 A1 | 8/2007 | Tepper et al. | |
| 2009/0040597 A1 | 2/2009 | Rae et al. | |

OTHER PUBLICATIONS

U.S. Appl. No. 11/931,501, filed Oct. 31, 2007, Huang et al.

(Continued)

*Primary Examiner* — Matthew Savage
(74) *Attorney, Agent, or Firm* — Mossman Kumar & Tyler PC (57) ABSTRACT

Nanoparticle-treated particle packs, such as sand beds, may effectively filter and purify liquids such as waste water. Proppant beds treated with nanoparticles may fixate or reduce fines migration therethrough. When tiny contaminant particles or fines in these fluids flow through the nanoparticle-treated bed or pack, the nanoparticles will capture and hold the tiny contaminant or fines particles within the pack due to the nanoparticles' surface forces, including, but not necessarily limited to van der Waals and electrostatic forces. Nanoparticle-treated beds or packs may be recharged by contacting the bed with an inorganic acid (but not hydrofluoric acid) or an organic acid, and optionally followed by subsequent treatment with hydrofluoric acid. This treating substantially removes the nanoparticles and the fine particulates that have been removed from a fluid (e.g. wastewater being treated, produced fluids in a formation, etc.). The particle pack may then be re-treated or recharged with nanoparticles.

25 Claims, 2 Drawing Sheets

OTHER PUBLICATIONS

J. Hibbeler et al.; "An Integrated Long-Term Solution for Migratory Fines Damages," SPE 81017, SPE Latin American and Caribbean Petroleum Engineering Conference, Apr. 27-30, 2003, Port-of-Spain, Trinidac, Weste Indies, pp. 1-11.

P.D. Nguyen et al.; "Controlling Formation Fines at Their Sources to Maintain Well Productivity," SPE 97659, SPE International Improved Oil Recovery Conference in Asia Pacific, Kuala Lumpur, Dec. 5-6, 2005, republished SPE Production & Operations, May 2007, pp. 202-215.

Contributions by Motorola Corp., "Surface Cleaning and Wet Processing Terminology," Bd of Regents for the Univ. of Arizona, 1-5 pp. (1999).

* cited by examiner

METHODS FOR RECHARGING NANOPARTICLE-TREATED BEDS

CROSS-REFERENCE TO RELATED APPLICATION

This application is a continuation-in-part of U.S. patent application Ser. No. 12/111,361 filed Apr. 29, 2008.

TECHNICAL FIELD

The present invention relates to methods and compositions for recharging beds or packs of substrate particles with nanoparticles, and more particularly relates, in one non-limiting embodiment, to methods and compositions for recharging packs or beds with nanoparticles after acids are used to clean the packs or beds.

BACKGROUND

A treating fluid may contain an effective amount of a particulate additive to fixate or reduce fines migration through a particular zone, bed or pack as described in U.S. Patent Application Publication No. 2009/0312201 A1, incorporated by reference herein in its entirety. The particulate additive may be alkaline earth metal oxides, alkaline earth metal hydroxides, transition metal oxides, transition metal hydroxides, post-transition metal oxides, post-transition metal hydroxides, piezoelectric crystals and pyroelectric crystals. The particle size of the magnesium oxide or other agent may be nanometer scale, which scale may provide unique particle charges that help fixate the formation fines. Such particles may be termed nano-sized particles or nanoparticles herein. These treating fluids may be used as treatment fluids for subterranean hydrocarbon formations, such as in hydraulic fracturing, completion fluids, gravel packing fluids and fluid loss pills. The carrier fluid used in the treating fluid may be aqueous, brine, alcoholic or hydrocarbon-based.

In related technology, a fracturing fluid, gravel pack fluid and/or frac pack fluid containing particles such as proppants, gravel and/or sand, may also contain an effective amount of a nano-sized particulate additive to fixate or reduce fines migration therethrough, where the particulate additive may again be alkaline earth metal oxides, alkaline earth metal hydroxides, transition metal oxides, transition metal hydroxides, post-transition metal oxides, post-transition metal hydroxides, piezoelectric crystals and pyroelectric crystals. The nano-sized particulate additives are coated onto or associated with the gravel or proppant particles during application with a coating agent such as an oil. The particle size of the magnesium oxide or other agent may be nanometer scale, which scale may provide unique particle charges that help fixate the formation fines that come into contact with the bed of proppant, gravel or sand in the fracture. Again, the carrier fluid used in the treating fluid may be aqueous, brine, alcoholic or hydrocarbon-based. More details may be found at U.S. Pat. No. 7,721,803, incorporated by reference herein in its entirety.

It has also been discovered that nanoparticle-treated particle packs, such as sand beds, may effectively filter and purify liquids such as waste water. These packs and beds and methods for using them are described in U.S. Patent Application Publication No. 2009/0266766 A1, incorporated by reference herein in its entirety. When tiny contaminant particles in waste water flow through the particle pack, the nanoparticles in the pack will capture and hold the tiny contaminant particles within the pack due to the nanoparticles' surface forces, including, but not necessarily limited to, van der Waals and electrostatic forces. Coating agents such as alcohols, glycols, polyols, vegetable oil, and mineral oils may help apply the nanoparticles to the particle surfaces in the filter beds or packs.

However, in all of these treatment methods, at some point the nanoparticle-treated pack, bed or zone approaches its maximum capacity for capturing fines and inhibiting their flow from a formation through a particle pack into a wellbore, or its maximum capacity for removing contaminants in the waste water flowing through the pack or bed. It would thus be desirable if methods, techniques and/or compositions would be devised to regenerate and/or recharge the nanoparticle-treated particle packs so that their usefulness may be prolonged.

SUMMARY

There is provided, in one non-limiting form, a method for recharging a particle pack previously treated with old nanoparticles. The method involves removing the nanoparticles and fixated fines by contacting the particle pack with a first acid that may include inorganic acids and/or organic acids, except for hydrofluoric acid (HF). Optionally, and subsequently the particle pack may be contacted with a second acid that includes HF, but may include other acids (inorganic and/or organic) as well. Finally, the particle pack is re-treated with a slurry of new nanoparticles.

Representative but non-restrictive forms of the particle packs for purifying fluids include a plurality of substrate particles that have been treated with a particulate additive, which are comparatively smaller than the substrate particles. The particles in the particle pack may include, but are not necessarily limited to, sand, gravel, ceramic beads, glass beads, and combinations thereof. The particulate additive may have a mean particle size of 1000 nm or less, and are therefore sometimes called nanoparticles or nanoparticulates. The nanoparticulate additive may include, but not necessarily be limited to, alkaline earth metal oxides, alkaline earth metal hydroxides, transition metal oxides, transition metal hydroxides, post-transition metal oxides, post-transition metal hydroxides, piezoelectric crystals, and/or pyroelectric crystals. The nanoparticles may be present in an amount ranging from about 1 part particulate additive for 200 to 5000 parts by weight of substrate particles in the particle pack.

The particulate additives, also referred to herein as nano-sized particles or nanoparticles (e.g. MgO and/or $Mg(OH)_2$, and the like), appear to fixate, bind up, or otherwise capture contaminants, such as clay and non-clay particles, including charged and non-charged particles. Due to at least in part to their small size, the surface forces (e.g. van der Waals and electrostatic forces) of the nanoparticles help them associate, group or flocculate the tiny contaminant particles together in larger collections, associations or agglomerations. Such groupings or associations help capture the contaminants in place and keep them from moving and passing through with the liquid, resulting in a purified liquid. Thus, in many cases, the purifying ability of the particle pack may be improved by use of nano-sized particulate additives that may be much smaller in size than the contaminants.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to an aqueous fluid, a solvent-based fluid such as glycol, or oil-base fluid, e.g. mineral oil, may be used to treat the particle pack, such as a sand bed, which in turn is expected to purify, clarify and otherwise clean a fluid passing through it.

As will be described, similar nanoparticle treated proppant packs in the fractures of subterranean formations help fixate and prevent fines from flowing through the proppant pack and accumulating near the wellbore to inhibit or prevent the production of desired hydrocarbons. As defined herein, fines are particles having a particle size less than 37 microns (μm). The fines are smaller than the proppants, sand or gravel, but are generally larger than the nanoparticles used to help capture them and inhibit their movement.

DETAILED DESCRIPTION

U.S. Pat. No. 7,721,803 demonstrates that some nanoparticles coated on proppants by mineral oil or glycol can fixate formation fines in the proppant bed of fractures or gravel pack. In a somewhat similar way, U.S. Patent Application Publication No. 2009/0266766 A1 discloses a method and composition of using a nanoparticle-treated sand bed to purify waste water. Methods and compositions have now been discovered for cleaning, recharging and/or regenerating the proppant bed or gravel pack (sand bed) with a nanoparticle slurry for continuing formation fines fixation after the nanoparticles coated proppant bed or gravel pack are fully or partially occupied by formation fines. That is, the proppant pack or sand bed has reached or is beginning to reach its maximum ability to remove or fixate fines from a produced fluid or contaminants from water. Cleaning the proppant bed or gravel pack by pumping acids, e.g. mineral acid and/or organic acid, but not including hydrofluoric acid, into the proppant bed or gravel pack at least partially, or even substantially removes the fixated fines (including, but not limited to, clays and carbonate fines) and the nanoparticles, such as nano MgO. Optionally, and subsequently, relatively low concentrations, such as 2% of hydrofluoric acid alone or hydrofluoric acid mixed with other acids (mineral acids and/or organic acids) are pumped in to at least partially, or even to substantially dissolve the fixated fines, like clays and quartz fines, and the nanoparticles, if acid soluble. After the cleaning process and the first acid and optionally the second acid is flowed back or recovered, a nanoparticle slurry (nanoparticle, for instance 8 nm MgO, mixed with a mineral oil or a glycol) is squeezed into the cleaned proppant bed or gravel pack. The new nanoparticles will be attached on surface of the proppant or gravel to again continually fixate formation fines that are flowing through the proppant bed or gravel pack. This method may also be used for cleaning and recharging nanoparticles in a treated sand, ceramic, resin, or other type of particle bed to purify waste water. In the later method, typically one acid fluid system may be used. In all methods other agents may be used in the acid systems, such as salts, surfactants, chelants, dispersants, biocides, polymers, and the like. Optionally, a non-acid fluid system may be used after the first acid treatment and optionally the second acid fluid system to aid removal of the fixated fines and nanoparticles from the surface and/or pores of the particulate bed or pack.

In more detail, nano-sized particles such as magnesium oxide (MgO) may be used to fixate formation fines such as clay and quartz in subterranean hydrocarbon formations to inhibit, restrain or prevent them from migrating to near-wellbore regions to choke or damage the production of hydrocarbons. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

Laboratory tests have demonstrated that relatively small amounts of MgO nanoparticles can fixate and flocculate dispersed clay particles, and charged and non-charged colloidal silicas. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The nanoparticles may be pumped with a carrier fluid downhole deep within the formation to fixate fines. Optionally, these nanoparticles may be coated on proppant or sand at the surface or during placement downhole for frac-pack and gravel pack applications to fixate formation fines during these procedures. In one embodiment, a mixture of a coating agent and nanoparticles at least partially coats the selected proppant to fixate formation fines within a proppant pack or other porous media, or inhibit or prevent fines from migrating or moving within the subterranean formation. If gravel is at least partially coated with the coating agent and the nanoparticles, then the formation fines may be fixated within the gravel pack, or may be inhibited from migrating or moving within the subterranean formation.

The base fluid or carrier fluid (i.e. treatment fluids such as fracturing fluid, gravel pack fluid, spacer fluid, wellbore cleanup fluid, proppant pack cleanup fluid, filtration bed cleanup fluid, and the like) may be water-based, alcohol-based or oil-based, but in most expected embodiments is expected to be water-based. The carrier fluid or aqueous-based fluid may be brine. In non-limiting embodiments, the brines may be prepared using salts including, but not necessarily limited to, one or more of NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The base fluid or carrier fluid may also include components typical for treatment fluids, such as salts, oxidizers, enzymes, polymers, crosslinkers, pH buffers, surfactants, viscoelastic surfactants, corrosion inhibitors, scale inhibitors, chelants, biocides, preservatives, dispersants, anti-oxidants, reducing agents, sugars, alcohols, mutual solvents, defoamers, friction reducers, metals, resins, curing agents, non-emulsifiers, relative permeability modifiers, gas hydrate inhibitors, and the like.

Suitable nanoparticle carrier fluids or coating agents include, but are not necessarily limited to, mineral oil or other hydrocarbon that accomplishes the purposes of the methods and compositions described herein. Specific, non-limiting examples of suitable mineral oils include ConocoPhillips PURE PERFORMANCE® Base Oil, such as 225N and 600N oils; ConocoPhillips ULTRA-S™ oils, such as ULTRA-S™ 2, and ULTRA-S™ 4; Penreco DRAKEOL® oils, such as DRAKEOL® 21, DRAKEOL® 35 and DRAKEOL® 600; and ExxonMobil EXXSOL™ and NOR-PAR™ mineral oils, such as EXXSOL™ 80, EXXSOL™ 110, NORPAR™ 12 and NORPAR™ 15. It is expected that a fines control product will include nanoparticles in the coating agent oil, for instance about 1 to 15 wt % nano-sized MgO particles in the 600N mineral oil. This fines control product can be used alone or may be added to an aqueous base fluid in a relatively small amount, in one non-limiting embodiment, from about 5 to about 100 gptg. It has been discovered that during mixing, the fines control product (i.e. the nanoparticles in oil) will plate out on or at least partially coat the particles, such as proppant particles. That is, in cases where the base fluid is aqueous, the hydrophobic oil will be repulsed by the water and will coat the particles (e.g. proppant). How much coating of the particles that occurs is concentration dependant, based on both the amount of proppant used and the amount and type of fines control product used. In a non-limiting example the fines control product may additionally have a surfactant present, such as an oil-wetting surfactant like sorbitan monooleate (i.e. SPAN 80 from Uniqema), to improve and/or enhance the oil-wetting of the proppant particles by the fines control product. In another non-limiting example the presence of a surfactant may preferentially reduce the thickness of the 600N mineral oil layer on proppant particles. A reduced oil layer thickness may enhance nanoparticle exposure on proppant particles. Other agents besides SPAN 80 may be employed to optimize the oil coating or wetting on proppant particles, agents such as: sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like. It is not necessary that a resin be used as a coating agent or binder, and in one non-limiting embodiment, no resin is used.

For recharging the particle bed or pack, there may be cases where an oil, even the more environmentally acceptable oils like pharmaceutical grade mineral oil or food grade plant oils, may not be desired for re-treating (i.e. replating or recoating) the particle bed or pack with nanoparticles. In such cases other coating agents may be used, which include but are not limited to: water, brines, glycols, alcohols, polyols, syrups, and combinations thereof. In non-limiting examples of brines include 2% bw KCl, 9% bw KCl, 21% bw $CaCl_2$ and the like brines may be used. Non-limiting examples of glycols include monopropylene glycol, dipropylene glycol, monoethylene glycol, and the like. Non-limiting examples of alcohols include propanol, ethanol, methanol and the like. Non-limiting examples of polyols include mannitol, sorbitol, glycerol, xylitol, and the like. Non-limiting examples of syrups include corn syrup, cane syrup, sorghum syrup, and the like.

It is theorized that the nanoparticles remain on the proppant particles primarily by electrostatic and other charges between the nanoparticle and proppant particle surfaces, however, other attractions or coupling forces may exist to initially and over the long-term keep the nanoparticles coated on the proppant particles. The inventors do not want to be limited to any particular theory. It is suspected that in most conditions the oil carrier fluid only assists the initial coating process of the nanoparticles on to the proppant particles. However, other agents may be added to the oil carrier fluid that may further enhance the initial and/or long-term nanoparticle attraction to the quartz, glass, ceramic and the like proppant particles composition. Additionally, the surface of the proppant, or a select amount of proppant, may be treated with agents that may improve the overall attraction of the nanoparticles to the proppant.

Nano-sized particles of alkaline earth metal oxides, alkaline earth metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for fixating fines and inhibiting or preventing their undesired migration, rather than allowing them to damage production of the near-wellbore region of the reservoir. Specific types of particles in each of these categories are noted below and elsewhere, but it will be appreciated that any compound in these categories that can perform the necessary functions is included herein even though it has not been specifically mentioned.

Magnesium oxide particles and powders have been suitably used to fixate fines herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IIA, IVA, IIB and IIIB of the previous IUPAC American Group notation. These elements include, but are not necessarily limited to Mg, Ca, Ti, Zn and/or Al.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, PbZrTiO3, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these other crystals are generally not water soluble.

In one non-limiting explanation, when the aqueous carrier fluid mixed with very small pyroelectric crystals, such as nano-sized ZnO, is pumped downhole into underground formations that are under high temperature and/or pressure, the pyroelectric crystals are heated and/or pressed and high surface charges are generated. These surface charges permit the crystal particles to associate, link, connect or otherwise relate the formation fines together to fixate them together and also to the surrounding formation surfaces. The association or relation of the fines is thought to be very roughly analogous to the crosslinking of polymer molecules by crosslinkers, in one non-limiting image. No formation damage is expected from the use of the nano-sized particulate additives.

In one non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the mean particle size of the additives and agents ranges between about 1 nanometer independently up to about 500 nanometers. In another non-limiting embodiment, the mean particle size ranges between about 4 nanometers independently up to about 100 nanometers. In another non-restrictive version, the particles may have a mean particle size of about 100 nm or less, alternatively about 90 nm or less, and in another possible version about 50 nm or less, alternatively 40 nm or less.

The amount of nano-sized particles in the carrier fluid may range from about 20 to about 500 pptg (about 2.4 to about 60 kg/1000 liters). Alternatively, the lower threshold of the proportion range may be about 50 pptg (about 6 kg/1000 liters), while the upper threshold of proportion of the particles may independently be about 300 pptg (about 36 kg/1000 liters) pptg.

The nano-sized particles herein may be added to a mineral oil or other hydrocarbon as the carrier fluid—a synergistic combination which also serves to initially coat, or at least partially coat, the nanoparticles to the sand or proppant, which are then pumped into place downhole in a hydraulic frac, frac-pack or gravel pack treatment. In another non-limiting embodiment, the nano-sized particles coated on proppant or sand herein may be added to an aqueous fluid during a treatment. For recharging proppant and other particles already in place, a variety of treatment fluids may be used with a variety of components. For example, to re-treat proppant in a fracture, a light brine containing nanoparticles may be used. Optionally, additives like surfactants, biocides, polymers, and the like may be used in the re-treatment fluid. A method of diversion may also be used, that is, methods to keep the re-treatment fluid within a hydraulic fracture, such as the use of polymers, viscoelastic surfactant systems (like DIAMOND FRAQ™ by Baker Oil Tools), slowly water dissolving particulates, and the like may be of utility for optimizing the recoating of the proppant pack particles with nanoparticles.

Methods and compositions of nanoparticle-treated sand beds have also been discovered as useful to purify waste water. When tiny contaminant particles in waste water flow through a nanoparticle-treated sand bed, the nanoparticles will capture and hold the tiny contaminant particles in the sand bed by the nanoparticles' surface forces, including but not necessarily limited to, van der Waals and electrostatic forces, thereby removing them from the liquid. The contaminants or impurities may include, but not necessarily be limited to, sediments, soil particles, mining particles, water treatment particles, and the like. In one non-limiting embodiment the treated fluids are aqueous, by which is meant they contain water; in a non-restrictive, alternative embodiment the aqueous fluids are at least 50 weight % water, alternatively at least 30 wt % water. The purified water may thus be used as injection water in underground hydrocarbon reservoirs to effectively recover hydrocarbons, or as municipal water for continued purification for human consumption.

It has been discovered that nano-sized particles like MgO may be used to remove contaminants such as clay and non-clay particles from liquids, that is, to remove, reduce or rid them from being present in the fluid, such as water. Again, some nanoparticles not only have high surface areas compared to their small sizes, but also have relatively high surface charges that permit them to associate, link or connect other particles together, including other charged particles, but also other non-charged particles. In one non-limiting embodiment, these associations or connections between the contaminant particles and the nano-sized particles are due to electrical attractions and other intermolecular forces or effects as previously noted.

Laboratory tests have demonstrated that relatively small amounts of MgO nanoparticles can remove and eliminate dispersed clay particles. These are the same kinds of nanoparticles described previously with respect to fines fixation.

The nanoparticles may be applied directly to and placed on and in a particulate pack, such as a sand bed, typically by contacting the pack or bed with a fluid in which the nanoparticles are suspended. In one embodiment, a mixture of a coating agent and nanoparticles at least partially coat the selected sand bed or other porous media (substrate particles). If sand or gravel is at least partially coated with the coating agent and the nanoparticles, then the contaminants and impurities may be removed from the fluid, e.g. wastewater, and may be eliminated or suppressed thereby purifying the fluid.

The same nano-sized particles used to coat proppants, as described above in the fines formation discussion, may be used to coat sand beds for water purification.

In an additional non-restrictive version for the water-purification embodiment, the particle size of the additives and agents ranges between about 4 nanometers independently up to about 1000 nanometers. In another non-limiting embodiment, the particle size ranges between about 4 nanometers independently up to about 500 nanometers. In another non-restrictive version, the particles may have a mean particle size of about 250 nm or less, alternatively about 100 nm or less, and in another possible version about 50 nm or less, alternatively 40 nm or less.

The amount of nano-sized particles in the sand or ceramic bed pack material may be from about 1 pound of nanoparticles for about 200 pounds to 5000 pounds of sand. It will be appreciated that any other unit of weight may be used, for instance, from about 1 gram of nanoparticles for about 200 grams to 5000 grams of sand. In an alternate embodiment, the nanoparticles are present in an amount of from about 1 part by weight nanoparticles to about 1000 independently to about 2000 parts sand or ceramic pack material.

The nano-sized particles herein may be added to water, a glycol, alcohol, polyol, olefin, vegetable oil, fish oil, or mineral oil, or mixtures of these, as the carrier fluid—a combination which also serves to initially coat, or at least partially coat, the nanoparticles to the sand or ceramic. In another non-limiting embodiment, the nano-sized particles coated on ceramic particles or sand herein may be added to an aqueous fluid during a treatment.

The sand, ceramic, glass or other substrate particles of the pack or bed may have a mean particle size of the particles of from about 10 mesh to about 325 mesh (about 2000 microns to about 45 microns), in one non-limiting embodiment. Alternatively, the substrate particles may range in size from about 20 mesh independently to about 200 mesh (from about 850 microns independently to about 75 microns). The substrate particle size range may be wide, such as from about 40 mesh to about 200 mesh (from about 425 microns to about 250 microns), or the particle size range may be relatively narrow, such as from about 20 mesh to about 40 mesh (from about 850 microns to about 425 microns).

Laboratory tests have shown that 35 nanometer MgO particles and monopropylene glycol (PG) coated on a 20/40 mesh (850/425 micron) sand pack can successfully remove contaminants from wastewater.

While the methods and structures herein are sometimes described typically herein as having use in wastewater fluids, such as those from paper processing, the compositions and methods are also expected to be useful in oil field recovery, e.g. produced formation water, exhausted drilling muds, metal-working, agricultural operations, mining operations, environmental remediation operations, waste disposal operations, cleaning operations, manufacturing operations and the like.

The regeneration, reclamation, or recharging of nanoparticle-treated proppant beds or sand packs involves a one step and optionally a two-step treatment with acids. A goal is to substantially remove the nanoparticles, including the fines or contaminants thereon, that is, associated with the proppant or the sand through the action of the nanoparticles. By "substantially remove" is meant in one non-limiting embodiment at least 50% of the nanoparticles and/or the fines/contaminants, alternatively at least 75% of the nanoparticles and/or the fines/contaminants, and in another non-restrictive version at least 95% of the nanoparticles and/or the fines/contaminants. Of course, removing all (100%) of the nanoparticles and/or the fines/contaminants would be ultimately desirable, but this may not be practical because of the difficulties of ensuring that all the nanoparticles and/or the fines/contaminants are contacted with the acids, which is particularly challenging for proppant beds in fractures of subterranean formations. It will be appreciated that "remove" encompasses removing the nanoparticles and the fines/contaminants by dissolving them, as well as other chemical and/or physical relocation processes.

The particle pack is contacted with a first acid, which may be an inorganic acid, an organic acid, or mixtures thereof—except that hydrofluoric acid (HF) is not used. Optionally, the particle pack is subsequently contacted with a second acid that includes HF, but may optionally include any other inorganic or organic acids, even the same as those used in the first contacting. HF is introduced, injected or pumped into the particle bed second to dissolve clays and quartz and to avoid forming $CaF_2$ and $MgF_2$ precipitates.

Suitable inorganic acids for recharging particle packs include, but are not necessarily limited to, hydrochloric acid, phosphorous acid, phosphonic acid, sulfuric acid, sulfonic acid and mixtures thereof. Suitable organic acids for recharging particle packs include, but are not necessarily limited to, acetic acid, formic acid, glutaric acid, succinic acid, and adipic acid, oxalic acid (ethanedioic acid), malonic acid (propanedioic acid), pimelic acid (heptanedioic acid), and mixtures thereof. The mixture of dicarboxylic acids glutaric acid, succinic acid and adipic acid is known as HTO (high temperature organic) acid. Further details about HTO acid may be found in U.S. Pat. No. 6,805,198, incorporated by reference herein in its entirety.

It will be appreciated that when contacting the particle pack with the first acid and optional second acid there needs to be for a period of time greater than briefly so that the acids have time to contact and dissolve the nanoparticles and/or the fine particulates (e.g. fines or contaminants). However, an exact time period for contacting any particular particle pack will vary depending on a wide variety of interdependent factors, and thus such periods are difficult to predict in advance. For instance, the nature of the particle pack, including the nature of the substrate particles (e.g. sand, gravel, ceramic beads, glass beads, etc.), the nature of the nanoparticles, the nature of the fine particulates (e.g. fines, contaminants, etc.), the amount of fine particulates (e.g. how "loaded" the particle pack is, or how close to being "full" or saturated the particle pack is with the fine particulates), the size of the particle pack, the mechanism for delivering the acid (for instance, pumping downhole to a proppant pack in a fracture is more problematic and complex than flushing a sand bed on the surface), the temperatures and pressures involved in recharging the particle pack, etc., all affect the "soak" time. Nevertheless, to give some idea of typical soak times for the entire acid treatment, the particle pack may contact the fluid from about 15 minutes to about 3 hour, in another non-limiting embodiment from about 0.5 hour to about 1 hour. The soak time for first acid ranges from 5 minutes to 1 hour, and soak time for second acid from 10 minutes to 2 hours.

How much acid is needed may be roughly estimated. For the first step acid, the amount of nanoparticles used for the previous treatment is known and the amount of expected carbonate particles (fines) from the formation based on core analysis may be estimated. For the second step acid, based on the strength of HF used, one to three pore volume (pore volume of the proppant pack) of the acid is needed or helpful.

In one non-limiting embodiment the concentration of acid in the first acid treatment may be about 10% or less, alternatively about 5% or less. The amount of HF in the second acid treatment is low, for instance about 2% or less, alternatively about 1% or less. However, as noted, other acids may also be present together with HF in the second acid treatment and these other non-HF acids may be present in an amount of about 10% or less.

The invention will be further described with respect to the following Examples which are not meant to limit the invention, but rather to further illustrate a few of the various embodiments.

Example 1

The laboratory test for Example 1 was run in following steps:

1) Three hundred grams (300 g) 20/40 mesh (425-850 micron) high strength ceramic proppant from Carbo Ceramic, mixed with 3 ml nanoparticle slurry (1.5 ppg (0.18 kg/liter) 8 nm MgO, from NanoScale, in 600N mineral oil, from ConocoPhillips) was packed in an acrylic tube (1 inch ID (2.54 cm)).

Figure 1:
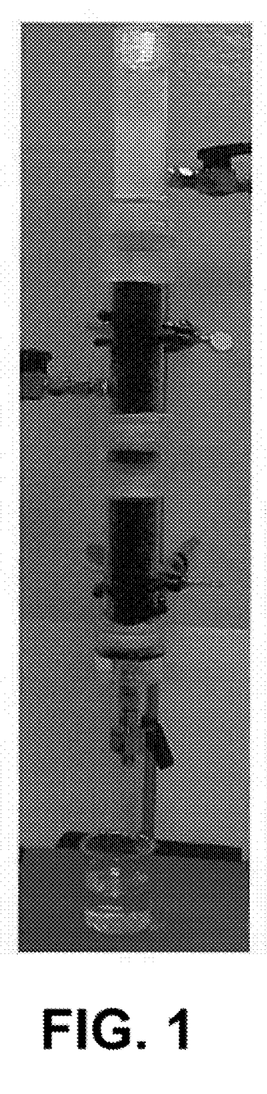
FIG. 1 is a photograph of a proppant pack test apparatus for a proppant pack that is treated with a nanoparticle slurry, showing a cloudy fluid simulating a "fines"-laden fluid at the top of the apparatus and clear fluid flowing from the apparatus at the bottom showing the "fines" having been removed.
Figure 2:
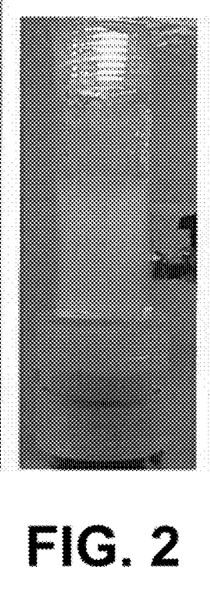
FIG. 2 is a more detailed photograph of the cloudy fluid at the top of the proppant pack test apparatus of FIG. 1, the cloudy fluid being water containing Rev Dust to simulate a fluid containing fines.
Figure 3:
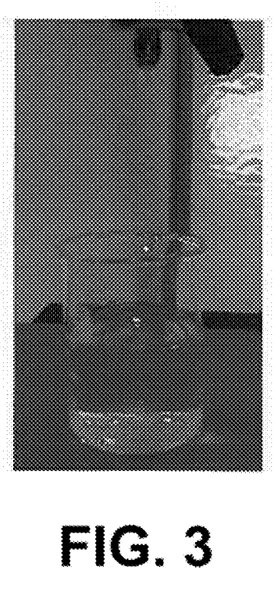
FIG. 3 is a more detailed photograph of the clear fluid having passed through the proppant pack test apparatus of FIG. 1 showing that the small particles or "fines" in the fluid having been removed.

2) Rev Dust was used as simulated formation fines. The mean particle size of Rev Dust is about 20 microns and it is composed of 12% quartz, 7% cristobalite, 4% illite, 29% mixed layers, 26% kaolinite, and 22% chlorite. 400 ml of 0.25% bw Rev Dust in deionized (DI) water was flowed through the pack at about 10 ml/min, showing that a cloudy fluid flows into the pack at top and clean filtrate water flows out the pack. FIG. 1 is a photograph of the proppant pack test showing the cloudy aqueous fluid containing the Rev Dust at the top of the apparatus and clear fluid flowing from the apparatus at the bottom. FIG. 2 is a close-up photograph of the cloudy water containing Rev Dust at the top of the apparatus of FIG. 1. The Rev Dust fines are fixated inside of the pack by the nanoparticles (fixating fines in the pack) yielding clear water at the bottom (FIG. 3).

Figure 4:
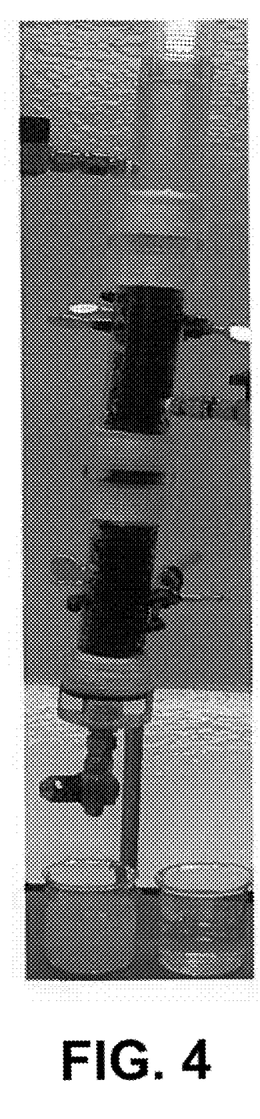
FIG. 4 is a photograph of the proppant pack test apparatus of FIGS. 1-3 where the proppant pack has been treated with nanoparticles, which nanoparticle-treated proppant pack has also been used to removed Rev Dust (simulating formation fines) from water, now showing a clear yellow HTO acid at the top of the apparatus and a cloudy yellow fluid leaving the bottom of the pack.
Figure 5:
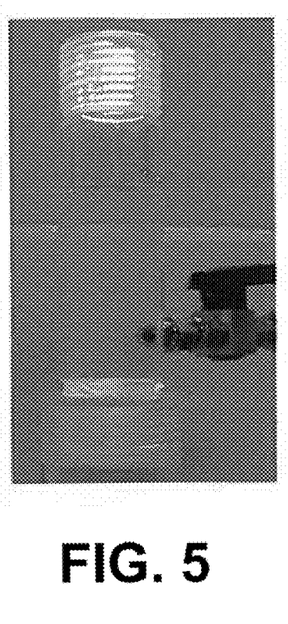
FIG. 5 is a more detailed photograph of the clear yellow HTO acid at the top of the proppant pack test apparatus of FIG. 4.
Figure 6:
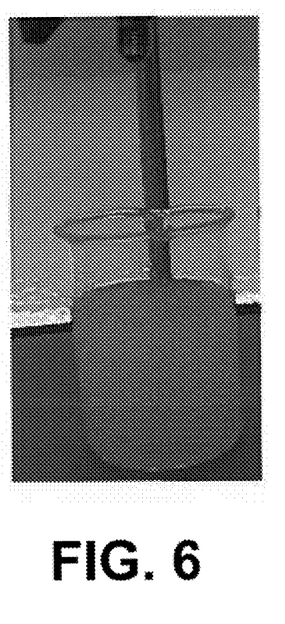
FIG. 6 is a more detailed photograph of the cloudy yellow HTO acid after it has been passed through the proppant pack to remove the nanoparticles and the Rev Dust "fines" associated therewith.

3) 100 ml 10% bw HTO acid (first acid) was flowed through the pack at 5 ml/min and followed by 100 ml 10% bw HTO together with 1.5% bw HF acid (together as second acid). The mixture of HTO and HF acids was soaked in the pack for 2 hours, and flowed out of the pack at 5 ml/min. It shown that clean yellowish acid was flowed into the pack from the top and cloudy dark yellow spent acid with reactant flowed out of the pack at bottom. The overall apparatus is shown in the photograph of FIG. 4. The clear yellow mixture of HTO acid and HF acid at the top of the test apparatus is shown in the close-up of FIG. 5; the cloudy, dark, yellow spent acid flowing out of the acid-treated proppant pack is shown in the close-up photograph of FIG. 6. 100 ml of DI water was flowed through the proppant pack, also by gravity feed, to clean out the acid in the pack (cleaning the pack).

4) A 3 ml amount of nanoparticle slurry (1.5 ppg (0.18 kg/liter) nanoparticles in 600N mineral oil) was diluted with 110N mineral oil (very low viscosity) into a 30 ml slurry. The diluted slurry was forced to flow through the pack at higher rate (about 30 ml/min) with air pressure at top of the pack (recharging the pack). The purpose of the high rate squeeze is to disperse the nanoparticles uniformly inside the entire proppant pack.

5) Step 2 was repeated. Another 400 ml Rev Dust in DI water was run through the recharged nanoparticle-treated proppant pack, and it showed the same result as in step 2 above. The cloudy fluid was flowed into the pack and clean filtrate water with a few clean oil drops were flowed out the pack (fixating fines in the pack again).

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, combinations of acids, substrate particles, nanoparticles, acid treating conditions, recharging conditions, coating agents and other components and conditions falling within the claimed parameters, but not specifically identified or tried in a particular method or composition, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for recharging a particle pack previously treated with nanoparticles comprising:
    substantially removing the nanoparticles, having a mean particle size of 1000 nanometers or less, with a method comprising contacting the particle pack with a first acid selected from the group consisting of inorganic acids, organic acids and mixtures thereof, except for hydrofluoric acid (HF); and
    re-treating the particle pack with a slurry of new nanoparticles.

2. The method of claim 1 where the method of substantially removing the old nanoparticles further comprises subsequently contacting the particle pack with a second acid comprising HF.

3. The method of claim 2 where the second acid further comprises an acid selected from the group consisting of inorganic acids, organic acids, and mixtures thereof.

4. The method of claim 2 where the particle pack additionally comprises fine particulates removed by the particle pack from a fluid, where the method further comprises substantially dissolving the fine particulates with the second acid.

5. The method of claim 1 where the inorganic acids are selected from the group consisting of hydrochloric acid, phosphorous acid, phosphonic acid, sulfuric acid, sulfonic acid and mixtures thereof, and the organic acids are selected from the group consisting of acetic acid, formic acid, glutaric acid, succinic acid, adipic acid, oxalic acid (ethanedioic acid), malonic acid (propanedioic acid), pimelic acid (heptanedioic acid), and mixtures thereof.

6. The method of claim 1 where re-treating the particle pack further comprises at least partially coating the particulate pack with a coating agent comprising a carrier fluid selected from the group consisting of water, brine, alcohol, glycol, polyol, syrup, vegetable oil, mineral oil, and combinations thereof.

7. The method of claim 1 where the new nanoparticles have a mean particle size of 1000 nm or less, and are selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof.

8. The method of claim 7 where
    the alkaline earth metal is selected from the group consisting of magnesium, calcium, strontium, and barium,
    the transition metal is selected from the group consisting of titanium and zinc, and
    the post-transition metal is aluminum.

9. The method of claim 1 where the particle pack comprises substrate particles selected from the group consisting of sand, gravel, ceramic beads, glass beads, and combinations thereof.

10. The method of claim 9 where the mean particle size of the substrate particles in the particle pack ranges from about 10 mesh to about 325 mesh (about 2000 microns to about 45 microns).

11. The method of claim 1 where an amount of the new nanoparticles is from about 1 part by weight nanoparticles additive for about 200 parts by weight of the particle pack to about 1 part by weight nanoparticles additive for about 5000 parts by weight of the particle pack.

12. A method for recharging a particle pack previously treated with old nanoparticles comprising:
    substantially removing the old nanoparticles with a method comprising contacting the particle pack with a first acid selected from the group consisting of inorganic acids selected from the group consisting of hydrochloric acid, phosphorous acid, phosphonic acid, sulfuric acid, sulfonic acid and mixtures thereof; organic acids selected from the group consisting of acetic acid, formic acid, glutaric acid, succinic acid, adipic acid, oxalic acid (ethanedioic acid), malonic acid (propanedioic acid), pimelic acid (heptanedioic acid), and mixtures thereof, and mixtures of these inorganic acids and organic acids, except for hydrofluoric acid (HF); and
    re-treating the particle pack with a slurry of new nanoparticles having a mean particle size of 1000 nm or less.

13. The method of claim 12 where the method of removing the old nanoparticles further comprises subsequently contacting the particle pack with a second acid comprising HF, where contacting the particle pack with the first acid and the second acid is performed for a period of time sufficient to substantially remove the nanoparticles.

14. The method of claim 13 where the second acid further comprises an acid selected from the group consisting of inorganic acids, organic acids, and mixtures thereof.

15. The method of claim 13 where the particle pack additionally comprises fine particulates removed by the particle pack from a fluid, where the method further comprises substantially dissolving the fine particulates with the second acid.

16. The method of claim 12 where re-treating the particle pack further comprises at least partially coating the particulate pack with a coating agent comprising a carrier fluid selected from the group consisting of water, brine, alcohol, glycol, polyol, syrup, vegetable oil, mineral oil, and combinations thereof.

17. The method of claim 12 where the new nanoparticles are selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof.

18. The method of claim 17 where
the alkaline earth metal is selected from the group consisting of magnesium, calcium, strontium, and barium,
the transition metal is selected from the group consisting of titanium and zinc, and
the post-transition metal is aluminum.

19. The method of claim 12 where the particle pack comprises substrate particles selected from the group consisting of sand, gravel, ceramic beads, glass beads, and combinations thereof.

20. The method of claim 12 where an amount of the new nanoparticles is from about 1 part by weight nanoparticles additive for about 200 parts by weight of the particle pack to about 1 part by weight nanoparticles additive for about 5000 parts by weight of the particle pack.

21. A method for recharging a particle pack previously treated with old nanoparticles, the particle pack comprising substrate particles, the old nanoparticles and fine particulates removed by the particle pack from a fluid, the method comprising:

substantially dissolving the old nanoparticles and the fine particulates using a method comprising:
contacting the particle pack with a first acid selected from the group consisting of inorganic acids selected from the group consisting of hydrochloric acid, phosphorous acid, phosphonic acid, sulfuric acid, sulfonic acid and mixtures thereof; organic acids selected from the group consisting of acetic acid, formic acid, glutaric acid, succinic acid, adipic acid, oxalic acid (ethanedioic acid), malonic acid (propanedioic acid), pimelic acid (heptanedioic acid), and mixtures thereof, and mixtures of these inorganic acids and organic acids, except for hydrofluoric acid (HF); and
subsequently contacting the particle pack with a second acid comprising HF and an acid selected from the group consisting of inorganic acids, organic acids, and mixtures thereof; and
re-treating the particle pack with a slurry of new nanoparticles.

22. The method of claim 21 where re-treating the particle pack further comprising at least partially coating the particulate pack with a coating agent comprising a carrier fluid selected from the group consisting of water, brine, alcohol, glycol, polyol, syrup, vegetable oil, mineral oil, and combinations thereof.

23. The method of claim 21 where the new nanoparticles have a mean particle size of 1000 nm or less, and are selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof.

24. The method of claim 23 where
the alkaline earth metal is selected from the group consisting of magnesium, calcium, strontium, and barium,
the transition metal is selected from the group consisting of titanium and zinc, and
the post-transition metal is aluminum.

25. The method of claim 21 where an amount of the new nanoparticles is from about 1 part by weight nanoparticles additive for about 200 parts by weight of the particle pack to about 1 part by weight nanoparticles additive for about 5000 parts by weight of the particle pack.

* * * * *